United States Patent
Roberts et al.

(10) Patent No.: US 8,930,576 B1
(45) Date of Patent: *Jan. 6, 2015

(54) SECURE COMMUNICATION NETWORK

(71) Applicant: KE2 Therm Solutions, Inc., Washington, MO (US)

(72) Inventors: Steve Roberts, Washington, MO (US); Cetin Sert, Heidelberg (DE)

(73) Assignee: KE2 Therm Solutions, Inc., Washington, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,863

(22) Filed: Jul. 11, 2014

Related U.S. Application Data (63) Continuation-in-part of application No. 13/950,365, filed on Jul. 25, 2013.

(51) Int. Cl.
  *G06F 15/16*   (2006.01)
  *H04L 29/06*   (2006.01)
  *H04N 21/258*  (2011.01)
  *H04L 12/24*   (2006.01)

(52) U.S. Cl.
  CPC ...... *H04L 63/0263* (2013.01); *H04N 21/25875* (2013.01); *H04L 41/28* (2013.01); *H04L 41/046* (2013.01)
  USPC ............... 709/246; 709/203; 709/223; 700/3; 700/90; 704/275; 704/E15.001; 713/176

(58) Field of Classification Search
  CPC ..... H04L 41/28; H04L 14/046; H04L 12/287; H04N 21/25875; H04N 21/4367
  USPC ......................................... 709/246, 203, 223
  See application file for complete search history.

(56) References Cited

U.S. PATENT DOCUMENTS

| | | | | |
|---|---|---|---|---|
| 6,466,571 | B1 * | 10/2002 | Dynarski et al. | 370/352 |
| 2004/0068657 | A1 * | 4/2004 | Alexander et al. | 713/176 |
| 2008/0134290 | A1 * | 6/2008 | Olsson | 726/3 |
| 2009/0271002 | A1 * | 10/2009 | Asofsky | 700/3 |
| 2013/0091193 | A1 * | 4/2013 | Nachtrab et al. | 709/202 |

OTHER PUBLICATIONS

Aivaliotis, Dimitri, Book "Mastering NGINX", specifically, Chapter 4, "NGINX as a Reverse Proxy" and Chapter 5, "Reverse Proxy Advanced Topics", Copyright 2013, Packt Publishing Ltd., Birmingham, United Kingdom (52 pgs.).

Nedelcu, Clement, Book "Nginx HTTP Server", specifically, Chapter 7, "Apache and Nginx Together", Copyright 2010, Packt Publishing Ltd., Birmingham, United Kingdom (33 pgs.).

Nedelcu, Clement, Book "Nginx HTTP Server, Second Edition", specifically, Chapter 6, "Apache and Nginx Together", Copyright 2013, Packt Publishing Ltd., Birmingham, United Kingdom (27 pgs.).

(Continued)

*Primary Examiner* — Arvin Eskandarnia
(74) *Attorney, Agent, or Firm* — Stinson Leonard Street LLP (57) ABSTRACT

The present invention is directed to a secure communication network that enables multi-point to multi-point proxy communication over the network. The network employs a smart server that establishes a secure communication link with each of a plurality of smart client devices deployed on local client networks. Each smart client device is in communication with a plurality of agent devices. A plurality of remote devices can access the smart server directly and communicate with an agent device via the secure communication link between the smart server and one of the smart client devices.

30 Claims, 6 Drawing Sheets

(56) References Cited

OTHER PUBLICATIONS

"SoftEther VPN", downloaded from the Internet at http://www.softether.org on Aug. 22, 2014. (10 pgs.).
"udpxy", downloaded from the Internet at http://www.udpxy.com/index-en.html on Aug. 22, 2014. (1 pg.).
"Gigapxy", downloaded from the Internet at http://www.gigapxy.com/index-en.html on Aug. 22, 2014. (12 pgs.).
"Gate One Web Terminal Emulator and SSH Client", downloaded from the Internet at http://liftoffsoftware.com/Products/GateOne on Aug. 22, 2014. (2 pgs.).
"Guacamole—HTML5 Clientless Remote Desktop", downloaded from the Internet at http://guac-dev.org/ on Aug. 22, 2014. (3 pgs.).
"Nmap Network Scanning, Host Discovery", downloaded from the Internet at http://nmap.org/book/man-host-discovery.html on Aug. 29, 2014. (6 pgs.).
"Nmap Network Scanning, Port Scanning Basics", downloaded from the Internet at http://nmap.org/book/man-port-scanning-basics.html on Aug. 29, 2014. (2 pgs.).
"Nmap Network Scanning, Port Scanning Techniques", downloaded from the Internet at http://nmap.org/book/man-port-scanning-techniques.html on Aug. 29, 2014. (6 pgs.).
"Nmap Network Scanning, Service and Version Detection", downloaded from the Internet at http://nmap.org/book/man-version-detection.html on Aug. 29, 2014. (3 pgs.).
"Nmap Network Scanning, Firewall/IDS Evasion and Spoofing", downloaded from the Internet at http://nmap.org/book/man-bypass-firewalls-ids.html on Aug. 29, 2014. (5 pgs.).

* cited by examiner

SECURE COMMUNICATION NETWORK

CROSS-REFERENCE TO RELATED APPLICATIONS

This application claims priority to and is a continuation-in-part of U.S. patent application Ser. No. 13/950,365, filed on Jul. 25, 2013, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention is directed generally to computer networks, and more specifically to a secure communication network that enables multi-point to multi-point communication between computing devices.

2. Description of Related Art

Computer networks and the exchange of data between networked computing devices are well known in the art. Examples of common communication protocols include User Datagram Protocol (UDP), Internet Protocol (IP), Transmission Control Protocol (TCP), Hypertext Transfer Protocol (HTTP), and File Transfer Protocol (FTP) to name a few. Many private computer networks, such as a local area network (LAN), provide access to the Internet or other public networks to enable communication outside of the private computer network. Further, many businesses establish a virtual private network (VPN) so that off-site employees can securely access their company's private network as if directly connected to that network. While this extended connectivity is useful and desirable, it raises issues of data security and access to private computer networks by unauthorized users.

To address these security concerns, private computer networks that provide access to the Internet may employ numerous security measures. These measures may include the use of authentication credentials (e.g., account names and passwords), the use of a firewall designed to prevent unauthorized access to a computer network, and the use of cryptographic protocols that provide communication security over the Internet. While all of these measures either alone or in combination address security concerns, they are not without drawbacks.

For example, many of these security measures require configuration of the computing devices on the private computer network and/or configuration of the network's firewall. While this configuration is routine for IT professionals, it is complicated or impossible for many users that do not have knowledge of network architecture. As a result, users must hire expert assistance to configure their private computer network or forego security entirely. Furthermore, the implementation and management of communication capabilities on the private computer network typically requires the use of one or several dedicated network devices, which can be relatively large and expensive to operate and maintain.

Thus, there remains a need in the art for a secure communication network that enables remote access to computing devices located behind a network firewall within a private computer network.

BRIEF SUMMARY OF THE INVENTION

The present invention is directed to a secure communication network that enables a plurality of remote devices to securely access a plurality of computing devices located behind a network firewall within a local client network. Each of the computing devices is referred to herein as an agent device. An agent device may comprise any IP (Internet Protocol) capable device, e.g., laptop computer, tablet, desktop computer, printer, storage device, or specialized control device, such as a controller for an embedded control system.

In accordance with the invention, the secure communication network includes a smart client device deployed within the local client network that communicates either directly or indirectly (e.g., through a network switch) with each of the agent devices. The smart client device also communicates over a secure communication link with a smart server located outside the client network. With such communication established, each remote device can access the smart server directly over an Internet connection and, if the remote device is properly authenticated, the smart server proxies port/application specific device communications between the remote device and one or more agent devices via the established secure communication link between the smart server and smart client device. The services supported by the network include those provided in a web access mode, a raw access mode and an application programming interface (API) mode.

Advantageously, the secure communication network of the present invention enables multi-point to multi-point communication between remote devices and agent devices located behind network firewalls within the local client networks. In addition, the secure communication network preferably employs standard data link layer communication protocols to establish secure communication through existing network firewalls without configuration of the firewalls. Further, the smart client device is preferably implemented in a small-profile, inexpensive hardware package operable to plug into an existing client network and establish a secure communication link with the smart server without complex configuration of the network.

BRIEF DESCRIPTION OF THE DRAWINGS

An exemplary embodiment of the present invention is described in detail below with reference to the attached drawing figures, wherein.

DETAILED DESCRIPTION OF EXEMPLARY EMBODIMENTS

The present invention is directed to a secure communication network that enables a plurality of remote devices to securely access a plurality of agent devices located within a client network. The invention will be described in detail below with reference to various exemplary embodiments in which the services supported by the network include those provided in a web access mode, a raw access mode and an API mode; however, it should be understood that the invention is not limited to these particular services and the network may be used to support any combination of these services or even other types of services. In addition, although the exemplary embodiment is described as embodying several different inventive features, one skilled in the art will appreciate that any one of these features could be implemented without the others in accordance with the invention.

Figure 1:
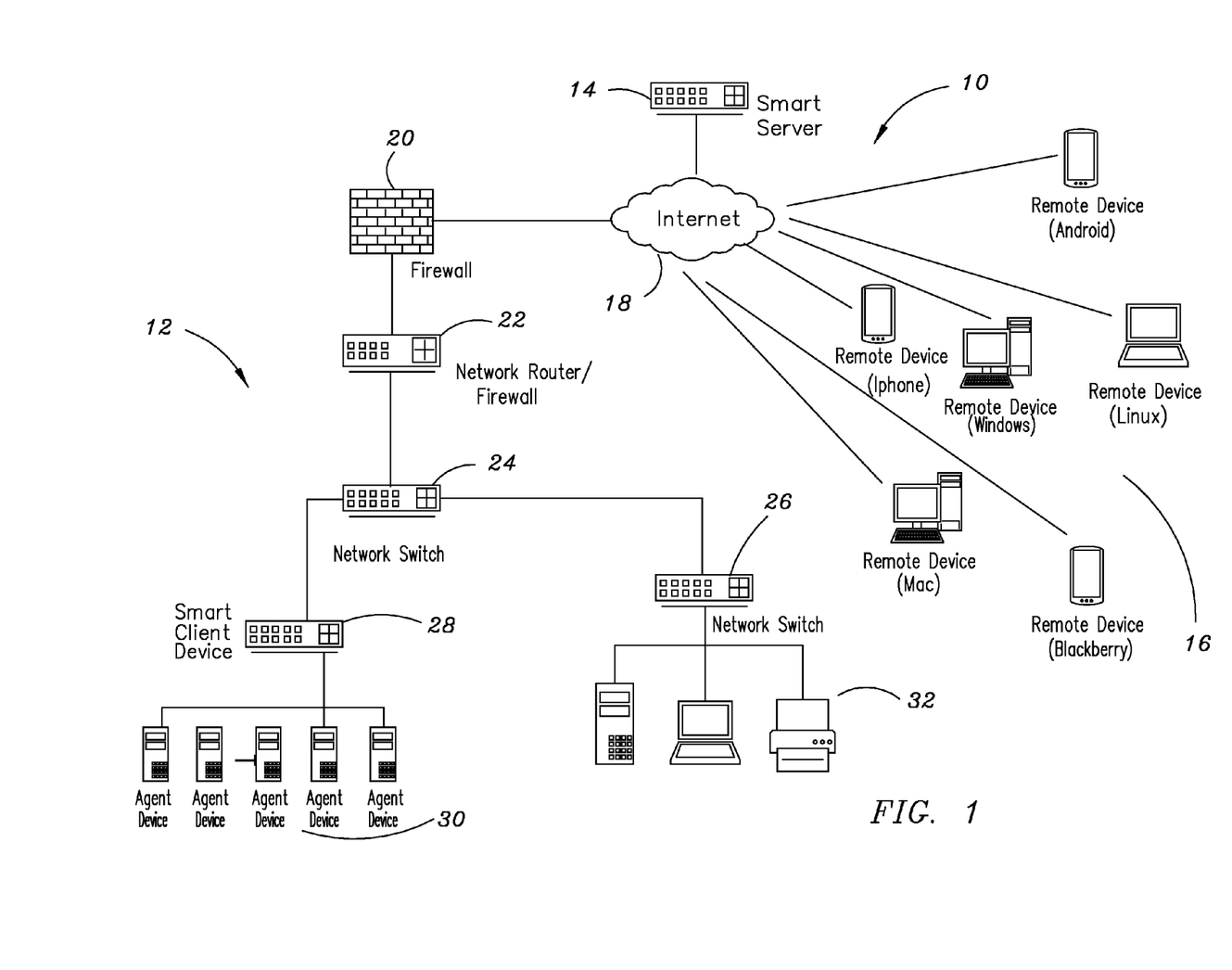
FIG. 1 is a diagram of a secure communication network in accordance with an exemplary embodiment of the present invention.

Referring to FIG. 1, a secure communication network in accordance with an exemplary embodiment of the present invention is shown generally as reference numeral 10. In general, network 10 includes a local client network 12, a smart server 14 (described in greater detail below), and a plurality of remote devices 16—each of which is in communication with the Internet 18 or any other wide area network with an Internet connection. Client network 12 includes a firewall 20 connected to a network router 22, which is in turn connected to network switches 24 and 26. Firewall 20, network router 22, and network switches 24 and 26 are off-the-shelf devices that preferably communicate using a standard data link layer protocol, as is known in the art. Network switch 24 is connected to a smart client device 28 (described in greater detail below), which is in turn connected to a plurality of agent devices 30. Network switch 26 is also connected to a plurality of other computing devices 32 (e.g., computers or peripheral devices) that are not agents of smart client device 28.

It should be understood that the invention is not limited to the network configuration of the exemplary embodiment shown in FIG. 1. For example, smart client device 28 could be placed between network router 22 and network switch 24, in which case network switch 24 would be connected to agent devices 30. In this example, smart client device 28 would communicate with agent devices 30 through network switch 24. Of course, other network configurations may also be used in accordance with the present invention.

Each of agent devices 30 comprises any IP (Internet Protocol) capable device, e.g., laptop computer, tablet, desktop computer, printer, storage device, or specialized control device, such as a controller for an embedded control system (i.e., any embedded control environment). Exemplary control systems include heating, ventilation, air conditioning and refrigeration (HVAC&R) systems, energy management systems, building automation systems, automotive and transportation systems, lighting control systems, security systems, surveillance systems, IP cameras and kiosks. Of course, other types of agent devices are also within the scope of the invention.

While a single client network 12 is shown in FIG. 1, it should be understood that network 10 can support a plurality of client networks each of which includes a smart client device (similar to smart client device 28) in communication with a plurality of agent devices (similar to agent devices 30), as well as other network devices known in the art.

Smart server 14 is assigned a public IP address and a DNS name to enable access by remote devices 16. Each of remote devices 16 may comprise any type of computing or communication device known in the art that is operable to access the Internet 18 via a wired, wireless, cellular or satellite connection. Each of remote devices 16 hosts a Hyper Text Markup Language (HTML) compliant browser application or equivalent program (i.e., a web browser) that can be used to connect with smart server 14 using either its public IP address or DNS name. Exemplary remote devices that are suitable for use with the present invention include smart phones (e.g., iPhone, Android and Blackberry devices) and computers/tablets that run on any type of operating system (e.g., Mac, Linux, Android or Windows).

As described in greater detail below, each of remote devices 16 connect with smart server 14 so as to be able to communicate with one or more available agent devices 30 via a secure communication link established between smart server 14 and smart client device 28. The communication between each of remote devices 16 and agent devices 30 is implemented via different modes of communication. In one aspect, a web access mode is provided in which an HTML compliant agent device 30 is accessed by a remote device 16 with a standard web browser (i.e., the remote device does not require any specific client application). In another aspect, a raw access mode is provided in which a "client" application on remote device 16 accesses a "server" application on agent device 30 (i.e., a standard client/server application). In yet another aspect, an API mode is provided in which a remote application on remote device 16 accesses an API application on agent device 30 (wherein various embodiments are described below for the API mode).

The smart client device 28 and smart server 14, which together enable implementation of the present invention, will be described in detail below.

Smart Client Device

In the exemplary embodiment, smart client device 28 preferably includes a microprocessor programmed to perform the methods described below in connection with FIGS. 2-4. The microprocessor is in communication with circuitry operable to implement communication using data link layer protocols. Smart client device 28 also includes non-volatile memory for storing custom software, operating parameters and device configuration settings, as well as random access memory (RAM) for storing communication information and other run-time parameters. Preferably, the microprocessor, circuitry, non-volatile memory and RAM of smart client device 28 are implemented in a small-profile, inexpensive hardware package operable to plug into an existing client network. Alternatively, smart client device 28 may comprise custom software running on off-the-shelf router hardware. In the exemplary embodiment, smart client device 28 is an embedded IP (Internet Protocol) capable device, for example, the MikroTik RB450G (with a 680 MHz processor, 256 MB Ram, 5 Gigabit Ethernet Ports, 1 microSD slot, 1 PoE (10-28 volt)), with custom software running a Linux operating system.

Smart client device 28 includes a plurality of ports for communication with other devices. At least one port is an Internet accessible port configured to connect for communication outside of client network 12. In this embodiment, the Internet accessible port is configured to connect via dynamic host configuration protocol (DHCP). Also, one or more ports of smart client device 28 are configured to connect to a computing device that enables management of the device. In addition, a plurality of ports of smart client device 28 are configured to connect to agent devices 30 located within client network 12. Alternatively, if smart client device 28 is placed between network router 22 and network switch 24, a single port of smart client device 28 is configured to connect to network switch 24, which is in turn connected to agent devices 30. Most preferably, the ports of smart client device 28 include standard Ethernet connectors. Alternatively, the smart client device may include wireless communication circuitry that enables wireless connections to specific devices.

The custom software (i.e., set of applications) on smart client device 28 is preferably operable to perform the following management and proxy functions:

(1) deployment (i.e., initial setup of smart client device 28);

(2) port scanning (i.e., discovering/detecting available agent devices 30 connected in the client network 12);

(3) server connection (i.e., establishing communication with smart server 14); and (4) communication (i.e., communication with agent devices 30 and smart server 14).

Each of these functional capabilities will be described in more detail below with reference to an exemplary operation of smart client device 28. In one embodiment, the custom software on smart client device 28 may also include a unified API framework that is used for communication with agent devices 30 that operate in the API mode, as described in greater detail below.

Figure 2:
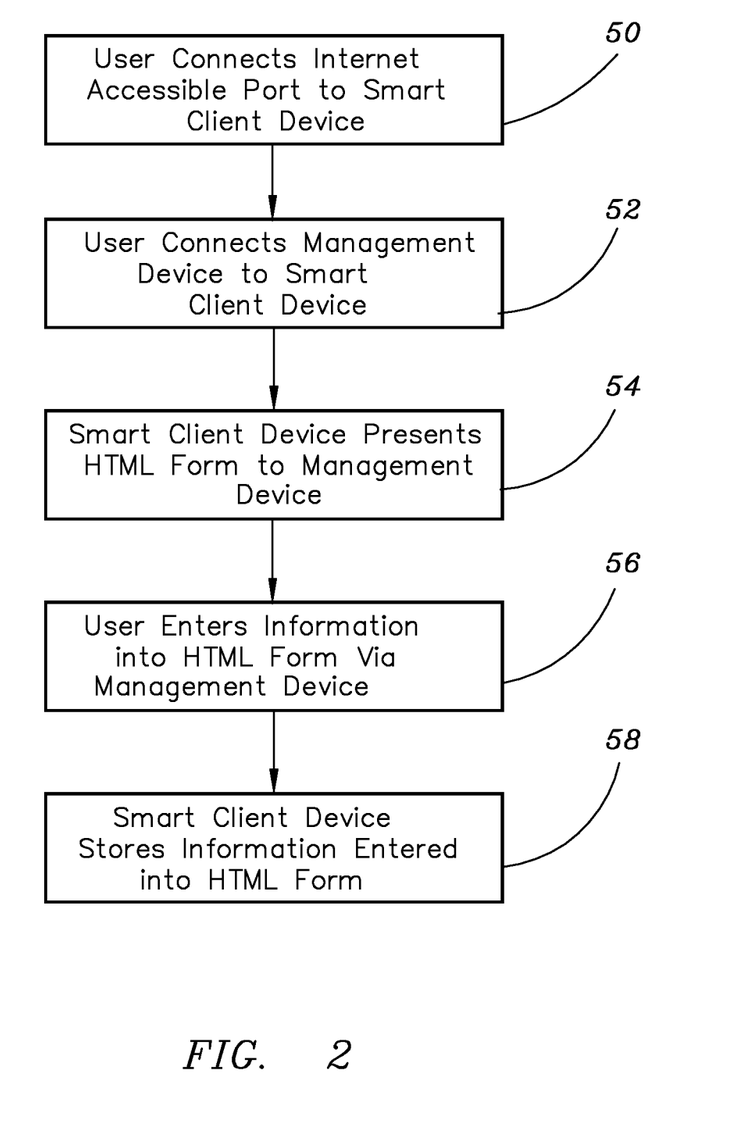
FIG. 2 is a flow diagram of an exemplary method of deploying a smart client device in a client network in accordance with the present invention.

Referring to FIG. 2, an exemplary method of deploying smart client device 28 in client network 12 is described with reference to steps 50-58. First, at step 50, a user connects a designated Internet accessible port of smart client device 28 to client network 12. At step 52, the user connects a computing device, such as a workstation, laptop computer, tablet, or smart phone, to a port of smart client device 28. As will be seen, this computing device provides management of smart client device 28 and is hereinafter referred to as a management device. Upon detection of the management device, smart client device 28 assigns the management device a management local IP address. The user then opens the management device's browser directed to the smart client device's IP address or device name.

At step 54, smart client device 28 presents an HTML form to the user on the management device. The information in the HTML form includes: an identity of smart client device 28 (pre-defined at the factory using the format xxxxx.domainname.com), a password (user-defined), agent ports (user-defined port numbers/services of agent devices 30), the IP address or DNS name of smart server 14, the status of smart client device 28 (connected/not connected), and a list of exceptions (user-defined to denote any agent devices 30 that should be ignored). It should be understood that the agent ports may comprise one or more port numbers for HTML compliant agent devices that communicate using the web access mode (e.g., ports 80, 443, 21, 22, 23, etc.) and/or one or more port numbers for other types of agent devices that communicate using either the raw access mode or API mode (e.g., ports 489, 958, 1122, etc.). As such, the present invention enables access to any type of agent device, whether compliant with a web standard or not. In one embodiment, the user makes selections from a dropdown list of port numbers and associated services (e.g., port 80-HTTP; port 22-SSH, etc.) in order to define the port numbers/services supported by smart client device 28. At step 56, the user enters the required information into the HTML form and clicks a "Save" button to save the entered information. At step 58, smart client device 28 stores the information in non-volatile memory upon the user's selection of the "Save" button. Once smart client device 28 has been deployed (as just described), it is ready for operation.

Figure 3:
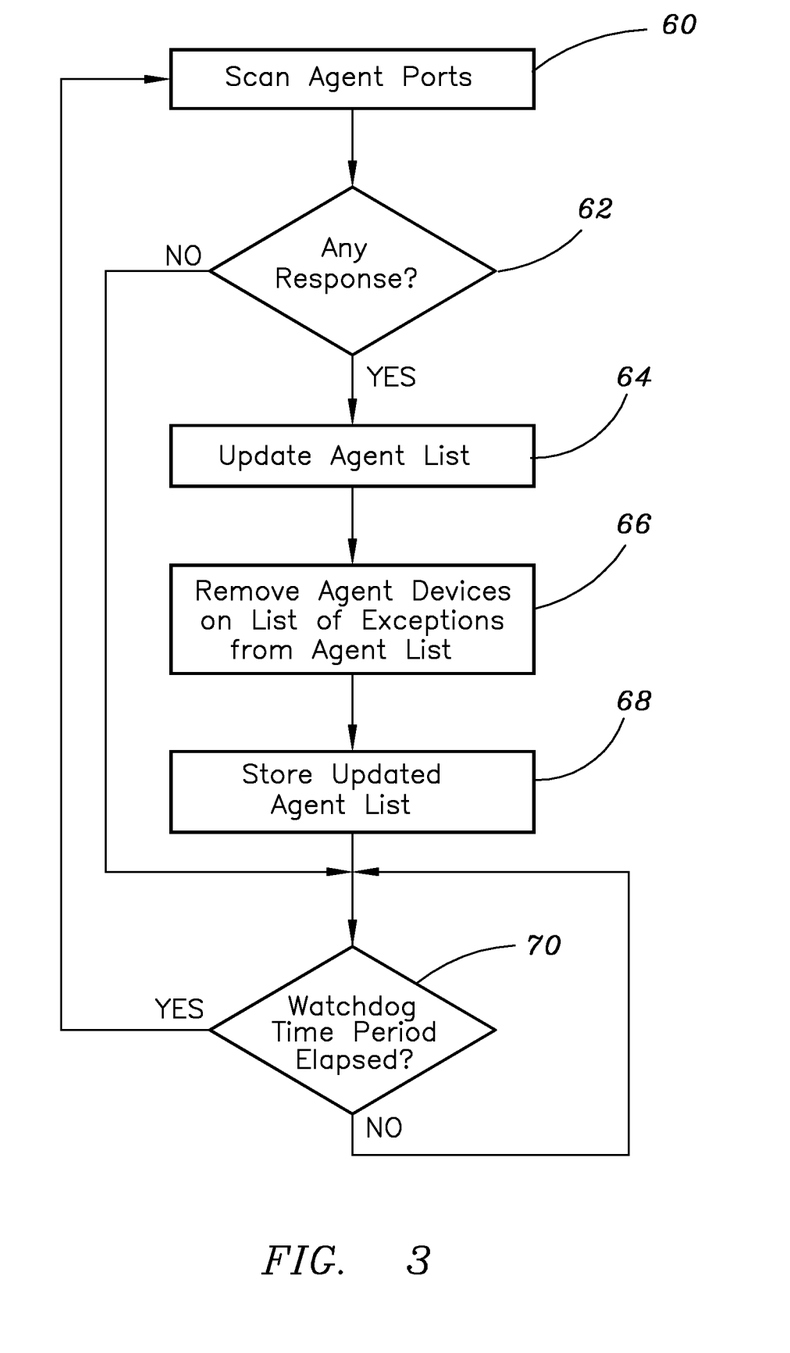
FIG. 3 is a flow diagram an exemplary method in which a smart client device establishes an agent list for a client network in accordance with the present invention.

Referring to FIG. 3, an exemplary method in which smart client device 28 establishes and maintains a list of agent devices 30 for client network 12 is described with reference to steps 60-70. At step 60, smart client device 28 scans the agent ports that were entered by the user in the HTML form during deployment of smart client device 28 to look for agent devices 30 that are published on the local network. Again, the agent ports may comprise one or more port numbers for HTML compliant agent devices and/or one or more port numbers for other types of agent devices. At step 62, smart client device determines if any agent devices 30 on the agent ports have responded to smart client device 28 by acknowledging the scan. If not, the method proceeds to the watchdog process of step 70 (described below). Otherwise, at step 64, upon receipt of an acknowledgement by one or more agent devices 30, smart client device 28 adds the responsive agent devices to an agent list maintained by smart client device 28.

The information on the agent list for each of agent devices 30 will depend on the type of agent device and associated mode of communication for that device. For agent devices that are accessed using the web access mode, the agent device information will include an identifier (i.e., a reserved slot from smart server 14 for the agent device), a protocol number (i.e., the communications protocol to be used by smart server 14 to present an appropriate web user interface to a remote device), and optionally an agent name. For agent devices that are accessed using the raw access mode, the agent device information will include an identifier (i.e., a reserved slot from smart server 14 for the agent device), connection parameters (i.e., the information to be presented by smart server 14 to enable a client application on a remote device to communicate with a server application on an agent device), and optionally an agent name. For agent devices that are accessed using the API mode, the agent device information will include an identifier (i.e., a reserved slot from smart server 14 for the agent device), an API definition (i.e., the set of commands to be presented by smart server 14 to enable a remote application on a remote device to query and control an API application on an agent device), and optionally an agent name.

At step 66, smart client device 28 compares the agent list to the list of exceptions that were entered by the user in the HTML form during deployment of smart client device 28. Any agent device identified on the list of exceptions is not processed by smart client device 28 and, thus, no further communication with that agent device will occur. Smart client device 28 then stores the updated agent list in non-volatile memory at step 68. Preferably, smart client device 28 is capable of supporting fifty (50) or more agent devices simultaneously.

At step 70, smart client device 28 periodically performs a watchdog process using a time period specified in the custom software (although the time period could alternatively be user-configurable on the HTML form). In the exemplary embodiment, the watchdog process is performed every 10 seconds. Each time the watchdog process is performed, steps 60-68 described above are performed so as to add any newly detected agent devices to the agent list and remove any agent devices previously on the agent list that are not responding to the scan. Also, any agent device identified on the list of exceptions is not processed by smart client device 28. Accordingly, the agent list is updated every 10 seconds.

Figure 4:
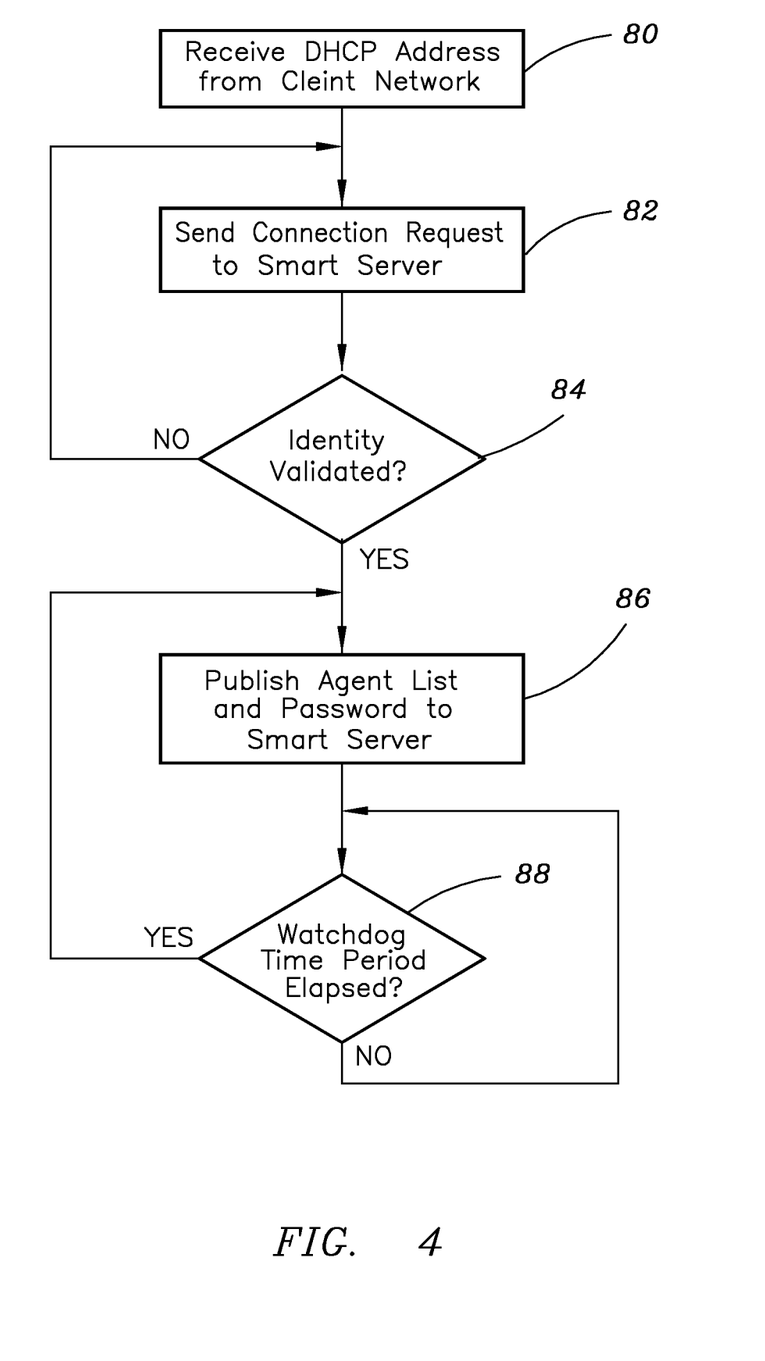
FIG. 4 is a flow diagram of an exemplary method in which a smart client device establishes a secure communication link with a smart server in accordance with the present invention.

Referring to FIG. 4, an exemplary method in which smart client device 28 establishes a secure communication link with smart server 14 is described with reference to steps 80-88. At step 80, when smart client device 28 is connected within client network 12 via the Internet accessible port as described above, smart client device 28 will be assigned a DHCP address (i.e., a local IP address) by network router 22 or a DHCP server, as is known in the art. At step 82, once active on client network 12, smart client device 28 sends a connection request that includes the identity of smart client device 28 (pre-defined at the factory) to smart server 14. This connection request is sent to the IP address or DNS name of smart server 14 that was entered by the user in the HTML form during deployment of smart client device 28. In the exemplary embodiment, smart client device 28 uses an outbound Secure Sockets Layer (SSL) connection over port 443 (the port generally associated with secure Internet traffic and generally open in standard network configurations). If that attempt fails, another SSL attempt is made over port 80. Additional attempts over other non-standard ports (e.g., ports 21, 22, 8080) are then performed if a connection is not made. It should be understood that any port may be used to establish a secure connection between smart client device 28 and smart server 14 in accordance with the present invention.

In step 84, if the identity of smart client device 28 is validated by smart server 14 (as will be described in more detail below with respect to the operation of smart server 14), then a secure communication link is established between smart server 14 and smart client device 28. Preferably, all communications between smart server 14 and smart client device 28 after validation of the identity of smart client device 28 are secured via the established SSL connection. Of course, one skilled in the art will understand that other cryptographic protocols that provide communication security over the Internet could also be used. If the identity of smart client device 28 is not validated by smart server 14, then the method returns to step 82 described above.

In step 86, once smart client device 28 receives notification from smart server 14 that its identity has been validated, smart client device 28 publishes or transmits its agent list and the password that was entered by the user in the HTML form during deployment of smart client device 28 to smart server 14. In step 88, smart client device 28 periodically performs a watchdog process using a time period specified in the custom software. This time period may vary depending on available bandwidth between smart client device 28 and smart server 14 and/or the frequency at which the agent list changes. For example, if a particular implementation provides a higher bandwidth connection and the agent list changes frequently, the watchdog process may be performed every 30 seconds (i.e., close to real-time). However, if a particular implementation provides a lower bandwidth connection and the agent list does not change as often, the watchdog process may be performed every 600 seconds. Each time the watchdog process is performed, step 86 described above is performed so as to update the agent list and password sent to smart server 14.

As described above, network 10 can support a plurality of client networks each of which includes a smart client device (similar to smart client device 28) in communication with a plurality of agent devices (similar to agent devices 30). It should be understood that the methods described above in connection with FIGS. 2-4 would be performed for each smart client device in network 10.

Smart Server

In the exemplary embodiment, smart server 14 comprises any suitable computer hardware with custom software programmed to perform the methods described below in connection with FIGS. 5-6. In the exemplary embodiment, smart server 14 is an IP (Internet Protocol) capable device with custom software running a Linux operating system. Of course, one skilled in the art will understand that other types of devices and operating systems could be used in accordance with the present invention.

Smart server 14 includes a plurality of ports for communication with other devices. Each port is an Internet accessible port configured to connect for communication with a smart client device (such as smart client device 28) or a remote device (such as one of remote devices 16). In this embodiment, each Internet accessible port is configured to communicate via DHCP.

The custom software (i.e., set of applications) running on smart server 14 is preferably operable to perform the following general functions:

(1) detection and validation of smart client devices (i.e., detect and validate the identity of one or more smart client devices requesting a connection with the smart server);

(2) communication with smart client devices (i.e., maintain an agent list and password for each smart client device);

(3) detection and validation of remote devices (i.e., detect one or more remote devices and validate the user-entered identity of a smart client device to which the user wants to establish a connection);

(4) presentment of available agent device information to remote devices; and (5) communication between remote devices and agent devices (i.e., proxy communications between remote devices and agent devices).

Each of these functional capabilities will be described in more detail below with reference to an exemplary operation of smart server 14 in relation to a single smart client device (i.e., smart client device 28) and a single remote device (i.e., one of remote devices 16). In one embodiment, the custom software on smart server 14 may also include a unified API framework that is used for communication with agent devices 30 that operate in the API mode, as described in greater detail below.

Figure 5:
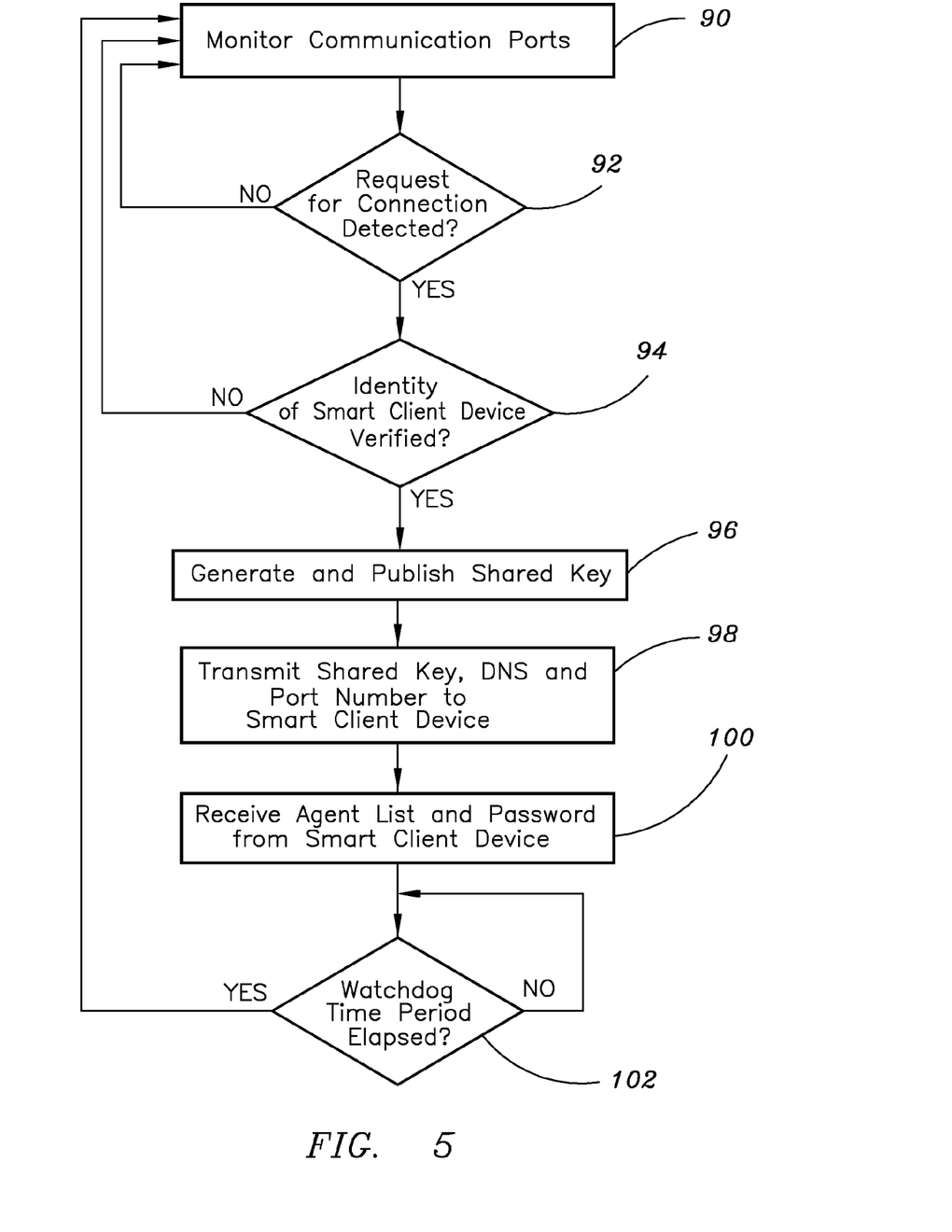
FIG. 5 is a flow diagram of an exemplary method in which a smart server establishes a secure communication link with a smart client device in accordance with the present invention.

Referring to FIG. 5, an exemplary method in which smart server 14 establishes a secure communication link with smart client device 28 is described with reference to steps 90-102. In step 90, smart server 14 monitors inbound communication traffic on the ports over which a smart client device 28 may be attempting to establish communication (e.g., ports 443 or 80). If smart server 14 does not detect any inbound communication in step 92, the method returns to step 90. If smart server 14 detects a request for connection, in step 94, it verifies the identity of the smart client device against a table of licensed connections (i.e., a list of authorized smart client devices). In this embodiment, smart server 14 verifies the X.509 identity of the smart client device by walking up the certificate chain. If the identity of the smart client device does not match any licensed connections, the smart client device will not be allowed to communicate further with smart server 14 and the method returns to step 90. However, in step 96, if the identity of smart client device 28 matches one of the licensed connections, smart server 14 generates a unique, random shared key in accordance with the Advanced Encryption Standard (AES) and publishes the shared key via inter-process communication (IPC) on the same host. In step 98, smart server 14 transmits the shared key along with its DNS identification and the port number for use in communication with smart server 14 (i.e., the port number on which the connection request was received) to smart client device 28. Of course, one skilled in the art will understand that smart server 14 may verify the identity of smart client device 28 using other verification techniques known in the art. As described above, all communications between smart server 14 and smart client device 28 after validation of the identity of smart client device 28 are preferably secured via the established SSL connection. Of course, one skilled in the art will understand that other cryptographic protocols that provide communication security over the Internet could also be used.

In step 100, with a secure communication link established between smart server 14 and smart client device 28, smart server 14 receives an agent list and password from smart client device 28, as described above, and adds the agent list and password to its local server table in association with the identity of smart client device 28. In step 102, smart server 14 periodically performs a watchdog process in accordance with TCP/IP standards. Each time the watchdog process is performed, steps 90-100 described above are performed so as to dynamically update the information stored on smart server 14. Thus, the agent list and password stored on smart server 14 will be essentially as current as the agent list and password maintained by smart client device 28.

Figure 6:
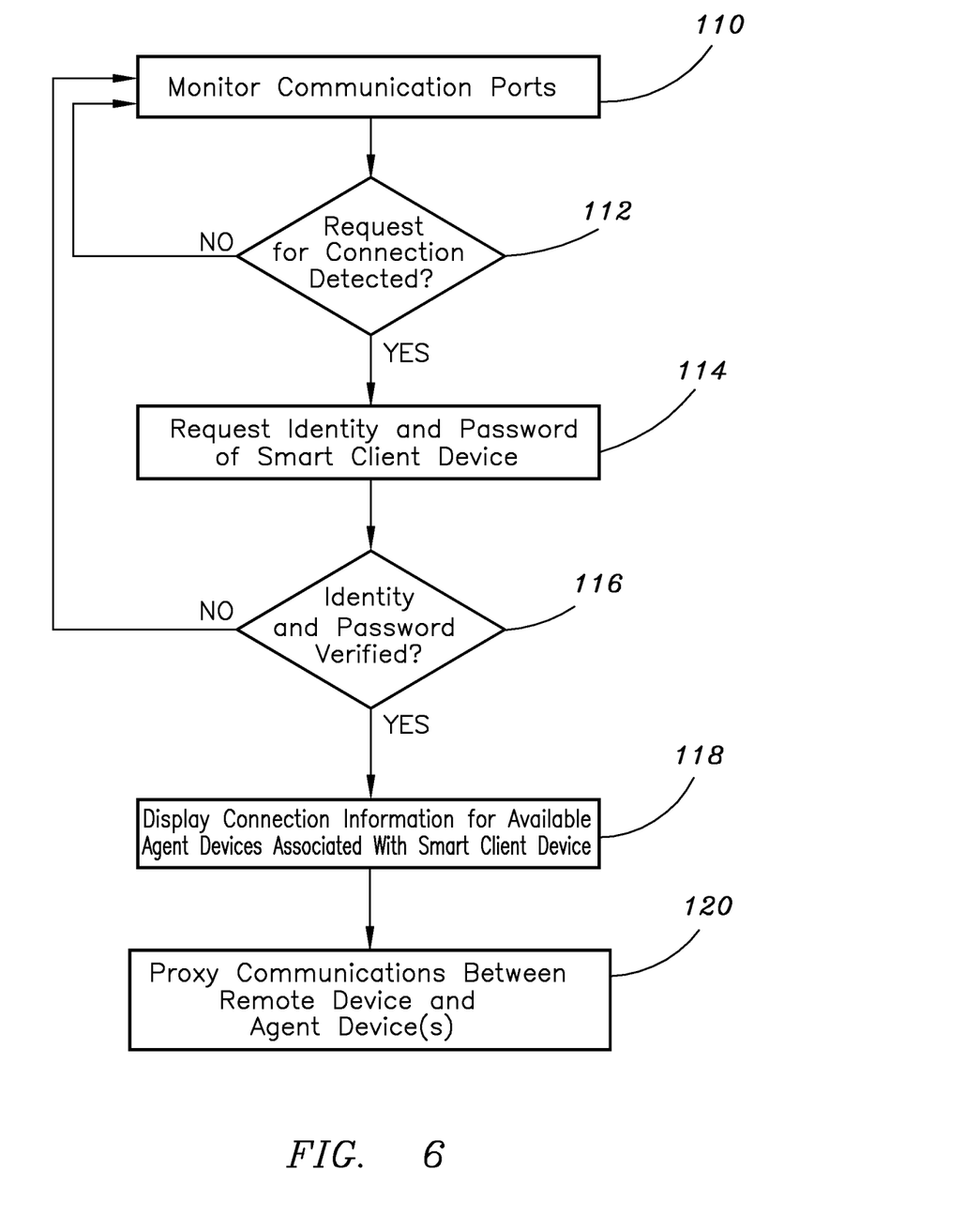
FIG. 6 is a flow diagram of an exemplary method in which a smart server proxies communications between a remote device and an agent device via the secure communication link established between the smart server and smart client device in accordance with the present invention.

Referring to FIG. 6, an exemplary method in which smart server 14 proxies communications between one of remote devices 16 and one of agent devices 30 via the secure communication link between smart server 14 and smart client device 28 is described with reference to steps 110-120. In step 110, smart server 14 monitors inbound communication traffic on the port over which one of remote devices 16 may be attempting to establish communication (e.g., port 443). If smart server 14 does not detect any inbound communication in step 112, the method returns to step 110. If smart server 14 detects a request for connection, in step 114, it presents a web user interface (UI) requesting the user of remote device 16 to enter an identity of a smart client device (i.e., an identity of a smart client device to which the user wants to establish a connection) and a password (i.e., the password that was entered by the user in the HTML form during deployment of the smart client device).

In step 116, upon receipt of an identity and password from remote device 16, smart server 14 compares the identity and password against its local server table (i.e., the local server table that stores the identity, password and agent list for each smart client device). If the identity and password do not match any of the smart client devices in the local server table, remote client device 16 will not be allowed to communicate further with smart server 14 and the method returns to step 110. However, in step 118, if the identity and password match one of the smart client devices in the local server table, such as the identity and password for smart client device 28, smart server 14 presents a web UI that displays connection information to enable communication with one or more of the available agent devices 30 associated with smart client device 28 (i.e., the agent devices included on the agent list). In step 120, smart server 14 proxies all communications between remote device 16 and one or more agent devices 30 via the secure communication link between smart server 14 and smart client device 28. Importantly, smart server 14 does not interfere with or store the actual data flow between remote device 16 and any of the agent devices 30.

It should be understood that the manner in which steps 118 and 120 are implemented will vary depending on the type of agent devices included on the agent list for smart client device 28 and the associated modes of communication that are used to provide access to such agent devices, as discussed below.

For those agent devices that are accessed via the web access mode, the web UI of smart server 14 presents remote device 16 with a list of available agent devices and uses the protocol number of each agent device (wherein the protocol number of each agent device is included in the agent list published or transmitted by smart client device 28 to smart server 14) to present a different web.UI for each communications protocol. Once remote device 16 selects one or more available agent devices, real-time bidirectional communication is established between remote device 16 and each selected agent device 30 via the secure communication link between smart server 14 and smart client device 28. In this case, remote device 16 need not host any custom application to enable communication with each selected agent device 30, i.e., remote device 16 only needs to host a standard web browser in this communication mode.

For those agent devices that are accessed via the raw access mode (wherein services cannot be rendered in a standard web browser), remote device 16 hosts one or more "client" applications and each agent device hosts a "server" application to thereby enable communication via a client/server based architecture (e.g., iPhone application, Android application, web server application, visual basic application, visual C application, Java application, C application, C++ application, etc.). In this case, the web UI of smart server 14 presents the remote device 16 with the connection parameters for each of the authorized agent devices 30 (wherein the connection parameters are included in the agent list published or transmitted by smart client device 28 to smart server 14). Remote device 16 can then apply one or more of the connection parameters to one or more client applications on remote device 16 to thereby establish bidirectional communication with one or more agent device 30s in real time via the secure communication link between smart server 14 and smart client device 28.

For those agent devices that are accessed via the API mode, remote device 16 hosts one or more remote applications to enable communication with an API application on each agent device 30 (discussed below). In this case, the web UI of smart server 14 presents the remote application with the API definition for each of the authorized agent devices 30 (wherein the API definitions are included in the agent list published or transmitted by smart client device 28 to smart server 14). Remote device 16 can then apply one or more of the API definitions to one or more remote applications on remote device 16 to thereby establish bidirectional communication with one or more agent devices 30 in real time via the secure communication link between smart server 14 and smart client device 28.

API Embodiments

As just discussed, remote device 16 hosts a remote application (or possibly a plurality of remote applications) to enable communication with those agent devices that are accessed via the API mode. One skilled in the art will understand that the API applications on some agent devices 30 may use the same communication protocol (e.g., when the agent devices are from the same vendor), while the API applications on other agent devices 30 may use different communication protocols (e.g., when the agent devices are from different vendors). There are a variety of different ways in which communications between remote device 16 and agent devices 30 can be handled.

In one embodiment, the API applications on agent devices 30 are directly exposed to remote device 16. If the API applications on agent devices 30 use the same communication protocol, remote device 16 can host a single remote application to communicate with each API application on each agent device 30. However, if the API applications on agent devices 30 use different communication protocols, remote device 16 must host a separate remote application for each of the communication protocols. For example, the API applications on a first group of agent devices may use protocol A, the API applications on a second group of agent devices may use protocol B, and the API applications on a third group of agent devices may use protocol C. In this case, remote device 16 would host a first remote application that uses protocol A to communicate with the first group of agent devices; remote device 16 would host a second remote application that uses protocol B to communicate with the second group of agent devices; and remote device 16 would host a third remote application that uses protocol C to communicate with the third group of agent devices. The advantage to this arrangement is that existing remote applications that have been written to consume the API applications for protocols A, B and C can run unmodified with direct access to all unique parts of the API applications. A disadvantage, however, is that there is no unified API framework to simplify the development of a new remote application (as in the embodiments described below).

In another embodiment, a unified API framework resides on smart client device 28. Preferably, the unified API is under the direct control of the main custom software that handles the functional capabilities described above in connection with smart client device 28 (e.g., deployment, port scanning, server connection and communication).

If agent devices 30 communicate using the same communication protocol, all communications from agent devices 30 to remote device 16 would be handled as follows: the individual agent devices 30 transmit data to smart client device 28, smart client device 28 aggregates the data and transmits the aggregated data to smart server 14, and smart server 14 proxies the aggregated data to a single remote application on remote device 16. Conversely, the communications from remote device 16 to agent devices 30 would be handled as follows: the remote application on remote device 16 transmits data to smart server 14, smart server 14 proxies the data to smart client device 28, and smart client device 28 segregates and distributes the data to the appropriate agent devices 30.

If agent devices 30 communicate using different communication protocols, the unified API on smart client device 28 would also perform the function of translating between the agent specific communication protocols (e.g., protocols A, B and C) and a common communication protocol (e.g., protocol X) (i.e., the unified API would reshape or convert the data from one format to another). It should be understood that the remote application on remote device 16 would communicate using the common communication protocol (e.g., protocol X). One advantage to this arrangement is that a single remote application on remote device 16 can communicate with different agent devices using different communication protocols. Another advantage is that certain operations can be blocked (e.g., allow turning on/off lights, but not allow turning on/off heat) in the unified API on smart client device 28. A disadvantage, however, is that updates to the API applications on the agent devices or the addition of a new agent device with a new API application would require updates to the unified API on smart client device 28 in order to adjust the translations.

In another embodiment, a unified API framework resides on smart server 14. Preferably, the unified API is under the direct control of the main custom software that handles the functional capabilities described above in connection with smart server 14 (e.g., detection and validation of smart client devices, communication with smart client devices, detection and validation of remote devices, presentment of connection information to remote devices, and communication between remote devices and agent devices).

If agent devices 30 communicate using the same communication protocol, all communications from agent devices 30 to remote device 16 would be handled as follows: the individual agent devices 30 transmit data to smart client device 28, smart client device 28 transmits the individual data streams for each client device to smart server 14, and smart server 14 aggregates the data and proxies the aggregated data to a single remote application on remote device 16. Conversely, the communications from remote device 16 to agent devices 30 would be handled as follows: the remote application on remote device 16 transmits data to smart server 14, smart server 14 segregates the data and proxies the individual data for each client device to smart client device 28, and smart client device 28 distributes the data to the appropriate agent devices 30.

If agent devices 30 communicate using different communication protocols, the unified API on smart server 14 would also perform the function of translating between the agent specific communication protocols (e.g., protocols A, B and C) and a common communication protocol (e.g., protocol X) (i.e., the unified API would reshape or convert the data from one format to another). It should be understood that the remote application on remote device 16 would communicate using the common protocol (e.g., protocol X). One advantage to this arrangement is that a single remote application on remote device 16 can communicate with different agent devices using different communication protocols. Another advantage is that API translations can be centrally adjusted in the unified API on smart server 14. A disadvantage, however, is that smart client device 28 is not in sole control of the exposed API and must trust smart server 14.

Of course, one skilled in the art will understand that network 10 can support any combination of the embodiments described above, i.e., these embodiments may be mixed and matched as desired for a particular application.

From the above description, it should be apparent that secure communication between each of remote devices 16 and one or more of agent devices 30 is enabled via the secure communication link established between smart client device 28 and smart server 14. This secure communication link is established essentially automatically and without complex configuration of firewall or network parameters by the user. The user need only perform a simple deployment process of smart client device 28 as described above. Thus, network 10 enables multi-point to multi-point communication, i.e., an essentially unlimited number of remote devices 16 can communicate with an essentially unlimited number of agent devices 30 located within an essentially unlimited number of client networks 12. In the exemplary embodiment, smart server 14 preferably can support up to five hundred and twelve (512) concurrent connections. Further, smart client device 28 can be installed on any network so as to enable Internet access to all network devices such as agent devices 30.

Finally, while network 10 has been described above in the context of a single password for each smart client device 28 (which is specified by the user who deploys smart client device 28 in client network 12), it should be understood that smart server 14 could provide functionality that enables a user to set-up additional authentication methodologies (e.g., passwords, images, email/SMS verifications, tokens, biometrics, etc.) for smart client device 28 in order to restrict the agent devices that can be accessed by specific users. In that case, smart server 14 would use the authentication information to determine the agent devices that are authorized to be accessed by that remote device (which could be less than the available agent devices on the agent list). This would provide greater security and control over access to specific agent devices in client network 12.

While the present invention has been described and illustrated hereinabove with reference to an exemplary embodiment, it should be understood that various modifications could be made to this embodiment without departing from the scope of the invention. For example, the services supported by the network of the exemplary embodiment include those provided in a web access mode, a raw access mode and an API mode. Alternatively, the network could support any one or combination of these particular services and/or could support other types of services entirely in accordance with the invention. Therefore, the present invention is not to be limited to the specific network architecture or methodology of the exemplary embodiment, except insofar as such limitations are included in the following claims.

What is claimed and desired to be secured by Letters Patent is as follows:

1. A secure communication network, comprising:
   a plurality of local client networks each of which comprises a client device in communication with a plurality of agent devices, wherein the client device comprises an embedded IP (Internet Protocol) device;
   a server that communicates over a secure communication link with the client device of each of the local client networks, wherein the server stores an agent list for the client device of each of the local client networks; and
   a plurality of remote devices in communication with the server, wherein the server (a) receives from each remote device an identity of a client device of one of the client networks, (b) uses the agent list for the identified client device to present information on one or more agent devices to enable the remote device to selectively access one or more of the presented agent devices, and (c) proxies all communications between the remote device and the one or more of the presented agent devices via the secure communication link between the server and the client device.

2. A method of enabling secure communication between a plurality of remote devices and a plurality of local client networks, comprising:
   causing a client device to be deployed within each local client network, wherein the client device comprises an embedded IP (Internet Protocol) device in communication with a plurality of agent devices within the local client network;
   using a server to:
      establish a secure communication link with the client device of each local client network;
      store an agent list for each client device;
      receive from each remote device an identity of a client device;
      use the agent list for the identified client device to present information on one or more agent devices to enable the remote device to selectively access one or more of the presented agent devices; and
      proxy all communications between the remote device and the one or more of the presented agent devices via the secure communication link between the server and the client device.

3. A system that enables secure communication between a plurality of remote devices and a plurality of local client networks, comprising:
   a plurality of client devices each of which is deployed within one of the local client networks for communication with a plurality of agent devices within that local client network, wherein each of the client devices comprises an embedded IP (Internet Protocol) device;
   a server operable to:
      establish a secure communication link with each client device of each local client network;
      store an agent list for each client device;
      receive from each remote device an identity of a client device;
      use the agent list for the identified client device to present information on one or more agent devices to enable the remote device to selectively access at least one of the presented agent devices; and
      proxy all communications between the remote device and the at least one of the presented agent devices via the secure communication link between the server and the client device.

4. The system of claim 3, wherein each agent device is accessed by each remote device using one of the following modes of communication: a web access mode, a raw access mode, and an application programming interface (API) mode.

5. The system of claim 4, wherein the web access mode is used when one of the remote devices communicates with one of the agent devices using a web browser application.

6. The system of claim 4, wherein the raw access mode is used when a client application on one of the remote devices communicates with a server application on one of the agent devices.

7. The system of claim 4, wherein the API mode is used when a remote application on one of the remote devices communicates with an API application on one of the agent devices.

8. The system of claim 7, wherein a unified API framework resides on the client device to enable communication between one of the remote devices and a plurality of API applications on a plurality of the agent devices.

9. The system of claim 7, wherein a unified API framework resides on the server to enable communication between one of the remote devices and a plurality of API applications on a plurality of the agent devices.

10. The system of claim 3, wherein one or more of the agent devices are HTML compliant.

11. The system of claim 3, wherein one or more of the agent devices are not HTML compliant.

12. The system of claim 3, wherein each client device includes (i) an Internet accessible port configured to connect for communication outside of the local client network, (ii) a port configured to connect to a management device operable to deploy the client device in the local client network, and (iii) a plurality of ports configured to connect to the agent devices of the local client network.

13. The system of claim 12, wherein the client device presents an HTML form on the management device for entry of information, wherein the information entered into the HTML form includes a plurality of user-defined port numbers and associated services of the agent devices.

14. The system of claim 13, wherein the information entered into the HTML form includes a user-defined exceptions list that denotes any agent devices to be ignored.

15. The system of claim 14, wherein the client device maintains the agent list for the local client network by periodically (i) scanning the user-defined port numbers of the agent devices to detect agent devices that acknowledge the scan, (ii) adding to the agent list information on the agent devices that acknowledge the scan, and (iii) ignoring the agent devices on the user-defined exceptions list.

16. The system of claim 3, wherein the client device periodically transmits the agent list and a user-defined password to the server, and wherein the server stores the agent list and the user-defined password in association with the identity of the client device.

17. The system of claim 3, wherein the server is located outside each of the local client networks.

18. The system of claim 3, wherein each client device sends a request for connection to the server and, if the server validates the identity of the client device, the secure communication link is established between the client device and the server.

19. The system of claim 18, wherein the server validates the identity of the client device by comparing the identity of the client device to a list of authorized client devices.

20. The system of claim 3, wherein all communications between the server and each client device are secured via a Secure Sockets Layer (SSL) connection.

21. The system of claim 3, wherein the client device transmits to the server a port number for use in all communications between the client device and the server.

22. The system of claim 3, wherein the server includes a plurality of Internet accessible ports configured to connect for communication with each client device and each remote device.

23. The system of claim 3, wherein the agent list includes a protocol number for each agent device that is accessible using a web access mode.

24. The system of claim 23, wherein the server uses the protocol number of each agent device to present a different web user interface for each of a plurality of communication protocols.

25. The system of claim 3, wherein the agent list includes connection parameters for each agent device that is accessible using a raw access mode.

26. The system of claim 25, wherein the server presents the connection parameters for each agent device to the remote device to thereby enable the remote device to access one or more of the agent devices via the secure communication link between the server and the client device.

27. The system of claim 3, wherein the agent list includes an API definition for each agent device that is accessible via an API mode.

28. The system of claim 27, wherein the API definition comprises a plurality of commands that can be used to query and control the agent device.

29. The system of claim 27, wherein the server presents the API definition for each agent device to the remote device to thereby enable the remote device to access one or more of the agent devices via the secure communication link between the server and the client device.

30. The system of claim 3, wherein the communications between the remote devices and the agent devices comprise port/application specific device communications.

* * * * *